United States Patent [19]

De Vaan

[11] Patent Number: 5,573,324
[45] Date of Patent: Nov. 12, 1996

[54] IMAGE PROJECTION SYSTEM

[75] Inventor: Adrianus J. S. M. De Vaan, Eindhoven, Netherlands

[73] Assignee: U.S. Philips Corporation, New York, N.Y.

[21] Appl. No.: 248,945

[22] Filed: May 25, 1994

[30] Foreign Application Priority Data

Dec. 10, 1993 [BE] Belgium ................................ 09301368

[51] Int. Cl.⁶ .................................................. G03B 21/28
[52] U.S. Cl. ................................................ 353/77; 353/98
[58] Field of Search .................................. 353/37, 31, 78, 353/77, 74, 84; 359/98, 101, 105, 629, 634, 639; 348/762, 761, 766, 767

[56] References Cited

U.S. PATENT DOCUMENTS

| | | | |
|---|---|---|---|
| 4,127,322 | 11/1978 | Jacobson et al. | 353/31 |
| 4,969,732 | 11/1990 | Wright et al. | 353/77 |
| 5,193,015 | 3/1993 | Shanks | 353/84 |
| 5,280,178 | 1/1994 | Engelen et al. | 250/440.11 |
| 5,309,265 | 5/1994 | Buchecker et al. | 359/102 |
| 5,335,022 | 8/1994 | Braun et al. | 353/20 |

FOREIGN PATENT DOCUMENTS

| | | |
|---|---|---|
| 0333333 | 9/1989 | European Pat. Off. . |
| 0407830 | 1/1991 | European Pat. Off. . |
| 0488590 | 6/1992 | European Pat. Off. . |
| 3243932 | 10/1991 | Japan . |

OTHER PUBLICATIONS

"Polarizing Color Filters Made From Cholesteric LC Silicones", by R. Maurer et al, SID International Symposium 1990, Digest of Technical Papers, pp. 110–113.

"Retardation Film of STN–LCDs 'NRF'" by the firm of Nitto Denko in SID '92 Exhibit Guide, Society for Information Display, May 17–22, 1992, Boston, MA, USA.

Primary Examiner—William C. Dowling
Attorney, Agent, or Firm—Michael E. Schmitt

[57] ABSTRACT

A compact and efficient image projection system is described. The projection beam supplied by a projector is incident on a beam splitter in the form of a cholesteric filter. The cholesteric filter reflects circularly polarized radiation having a wavelength which corresponds to the pitch of the molecular helix and having a direction of rotation which corresponds to the direction of the molecular helix to a reflector. The circular direction of polarization reflected by the cholesteric filter is inverted on the reflector so that the beam is subsequently passed to the screen by the cholesteric filter.

13 Claims, 2 Drawing Sheets

IMAGE PROJECTION SYSTEM

BACKGROUND OF THE INVENTION

The invention relates to an image projection system comprising a projector for supplying a projection beam which is modulated with the image to be projected, an image projection screen and a folding system arranged between the image projector and the image projection screen, the folding system comprising a beam splitter for at least partly reflecting the projection beam from the projector, and a reflector for receiving the part of the projection beam reflected by the beam splitter and for reflecting said part to the beam splitter again.

An image projector is herein understood to mean a device which is provided with an image display system and optical means for projecting the image generated by this system on an image projection screen. The generated image may be a video image, a graphic image, data or a combination thereof.

An image projection system of the type described in the opening paragraph is known from European Patent Application 0 333 333. The image projection system described in this Application includes a beam splitter which passes substantially half the incident projection beam and reflects substantially half this beam to a reflector which is arranged at the same side of the beam splitter as the projector. After reflection on the reflector, half of the beam is passed by the beam splitter again and half of the beam is reflected again. A drawback of this image projection system is a relatively low efficiency, because only about 25% of the unpolarized radiation emitted by the projector is incident on the image projection screen.

OBJECTS AND SUMMARY OF THE INVENTION

It is an object of the invention to provide a compact image projection system in which a much higher percentage of the projection beam supplied by the projector is utilized for displaying an image on the screen, so that a more efficient image projection system is obtained.

The image projection system according to the invention is therefore characterized in that the beam splitter is a cholesteric filter.

The image projector may consist of, for example one cathode ray tube and one projection lens in the case of monochrome image projection, or of three cathode ray tubes and three projection lenses in the case of a color image projection system. Such an image projector supplies an unpolarized projection beam and is described, for example in U.S. Pat. No. 4,127,322.

However, the image projector is preferably an LCD projector. In the case of a color image projection system, the projector may comprise three liquid crystal display panels, one for each of the primary colors red, green and blue, or a single display panel in combination with a pattern of color filters. Since such a projector supplies a polarized projection beam, this projection beam is consequently utilized to an optimum extent in the present invention.

Cholesteric filters are optical filters comprising an optical layer of a liquid crystalline material having a cholesteric ordering. This means that the molecules of the material are ordered to a helical or helix-like structure with a pitch p. After such a material has been provided in the form of a thin, optically active layer between two parallel substrates, the helix-like structure is aligned in such a way that the axis of the helix will be transverse to the layer. The alignment of the helix can be improved by providing an orientation layer on the facing surfaces of the substrates.

Such a filter is polarization-sensitive and will reflect a circularly polarized radiation component having a direction of rotation (levorotatory or dextrorotatory) which corresponds to the direction of the molecular helix and having a wavelength which corresponds to the pitch p of the helix. A circularly polarized component having the opposite direction of rotation and/or having a wavelength which is not adapted to the pitch will be passed by the filter. Radiation having a state of polarization which is not adapted to the filter is thus not absorbed but is reflected to the reflector. This reflector inverts the circular direction of polarization rotation so that the radiation will now have a state of polarization which is adapted to the filter and will consequently be passed.

Cholesteric filters are known per se from, for example the article "Polarizing Color Filters made from Cholesteric LC Silicones" by R. Maurer et al. in SID International Symposium 1990, Digest of Technical Papers, pp. 110–113. The cholesteric filters described in this article have an optically active layer consisting of a liquid crystalline material with a cholesteric ordering based on silicones.

If the radiation source is an LCD projector, the state of polarization of the radiation supplied by the LCD projector is to correspond in the image projection system according to the invention to the state of polarization for which the cholesteric filter has a reflective effect.

There are image display panels which modulate linearly polarized radiation and image display panels which modulate circularly polarized radiation. An image display panel is herein understood to mean the combination of the liquid crystalline layer with a polarizer and an analyser. LCD projectors with "linear" display panels supply linearly polarized radiation. In order that this radiation can be reflected by the cholesteric filter to the reflector, the linearly polarized radiation is first to be converted into circularly polarized radiation suitable for the filter by means of, for example a $\lambda/4$ plate which can be mounted, for example on the projector. If use is made of an LCD projector operating with "circular" display panels and thus supplies circularly polarized radiation, a conversion will not be necessary and consequently the $\lambda/4$ plate can be dispensed with. When an LCD projector is used, it is principally possible that, apart from radiation losses within the system, 100% of the projection beam radiation can reach the image projection screen.

If the projector has one or more cathode ray tubes, approximately 50% of the radiation supplied by the projector will be incident on the image projection screen.

A preferred embodiment of the image projection system according to the invention is characterized in that the cholesteric filter is active within at least an essential part of the full visible wavelength range.

It is to be noted that it is known, for example from the English-language abstract of JP-A 3-243932 to polarize an unpolarized radiation beam by means of a polarization-sensitive beam splitter and to convert the sub-beam reflected by the beam splitter into the direction of polarization which is passed by the beam splitter by means of a $\lambda/4$ plate in combination with a reflector. This means that a beam splitter, a plate and a reflector are required for the polarization conversion. Moreover, the format in which such beam splitters can be made is, however, limited. In addition, it is then necessary to make use of a λ/4 plate already for the polarization conversion, which is very much dependent on the wavelength.

Since the cholesteric filter is active substantially within the entire visible wavelength range, which is in contrast to the polarization-sensitive beam splitters hitherto known and used in the image projection systems, and since it has the same effect for all wavelengths therein, an image projection in reliable colors will be possible. The circular polarization direction on the reflector is inverted into the direction of rotation which will be passed by the filter. In this way an efficient image projection system is obtained, not only for monochrome image projection but also for color image projection. Moreover, such a beam splitter can be manufactured in a relatively large format.

A further embodiment of the image projection system according to the invention is characterized in that the cholesteric filter comprises a plurality of layers of a liquid crystalline material, each layer being active for a different wavelength band, said wavelength bands jointly covering substantially the visible wavelength range.

An alternative embodiment of the image projection system according to the invention is characterized in that the cholesteric filter comprises a single layer of a liquid crystalline polymer material, within which layer the pitch of the molecular helix varies across the layer thickness between two values which correspond to the lower limit and the upper limit, respectively, of the wavelength band required to cover at least the full visible wavelength range.

This embodiment is based on the recognition that the pitch of the molecular helix can be varied continuously in a liquid crystalline polymer material with a cholesteric ordering. As described in U.S. patent application Ser. No. 08/179,420, allowed Aug. 25, 1995; in the name of the Applicant, which Application is herein incorporated by reference, it is possible to vary the pitch within a single layer to a sufficient extent, so that it is no longer necessary to stack a plurality of layers each formed by a liquid crystalline material having a different reflection band. By continuous variation of the pitch within a single layer, it is sufficient to use a layer thickness which is smaller than the total layer thickness required in the case of stacking different layers to cover the same reflection band, so that a filter having a better optical quality can be obtained. In fact, the quality of such filters decreases relatively rapidly with an increasing number of layers due to errors which are typical of cholesterics and due to loss of molecular ordering.

Even if use is made of cholesteric materials which are not suitable for realising a variation of the pitch of the helix in a single layer, which variation is required for color image projection, a satisfactory color image projection can nevertheless be realised. An embodiment of the image projection system according to the invention, in which this is the case, is characterized in that at least a plurality of layers of the cholesteric filter comprises a liquid crystalline polymer material, within which layers the pitch of the molecular helix varies across the layer thickness between two values which correspond to the lower limit and the upper limit, respectively, of the reflection wavelength band of the relevant layer.

An embodiment of the image projection system according to the invention, which is advantageous as far as contrast is concerned, is characterized in that a polarizer is arranged between the image projection screen and the beam splitter.

This polarizer absorbs substantially half the ambient light passed by the projection screen, which ambient light is reflected into the audience space by components of the system. In this manner the ambient light is suppressed so that the contrast can be improved considerably. There are projection screens in which this polarizer is arranged on the screen itself.

A further embodiment of the image projection system according to the invention is characterized in that a λ/4 plate is arranged between the polarizer and the beam splitter, the polarizer having an absorbing effect for the direction of polarization of the circular direction of polarization to be reflected by the cholesteric filter after conversion by the λ/4 plate.

If the selectivity of the cholesteric filter between levorotatory and dextrorotatory circularly polarized radiation were not perfect, the circularly polarized radiation wrongly passed by the cholesteric filter would be converted by the λ/4 plate into linearly polarized radiation whose direction of polarization corresponds to the direction of polarization absorbed by the polarizer. Due to the prepolarization by the cholesteric filter, this absorption is sufficiently small so that the polarizer will not be damaged by heating. The λ/4 plate prevents a defocused image on the projection screen due to projection beam light having an unwanted polarization and being directly incident through the filter.

For color image projection the λ/4 plate has a wide band. A wide-band λ/4 plate is a transparent element which is composed of, for example a plurality of layers and realises such a phase rotation in a beam for all wavelengths (λ) in the visible wavelength range that circularly polarized radiation is converted into linearly polarized radiation, or conversely. Such a λ/4 plate is described, for example in the publication: "Retardation Film for STN-LCDs 'NRF'" "by the firm of Nitto Denko in SID '92 Exhibit Guide, Society for Information Display, May 17–22, 1992, Boston, Mass., U.S.A.

These and other aspects of the invention will be apparent from and elucidated with reference to the embodiments described hereinafter.

DESCRIPTION OF THE PREFERRED EMBODIMENTS

Figure 1:
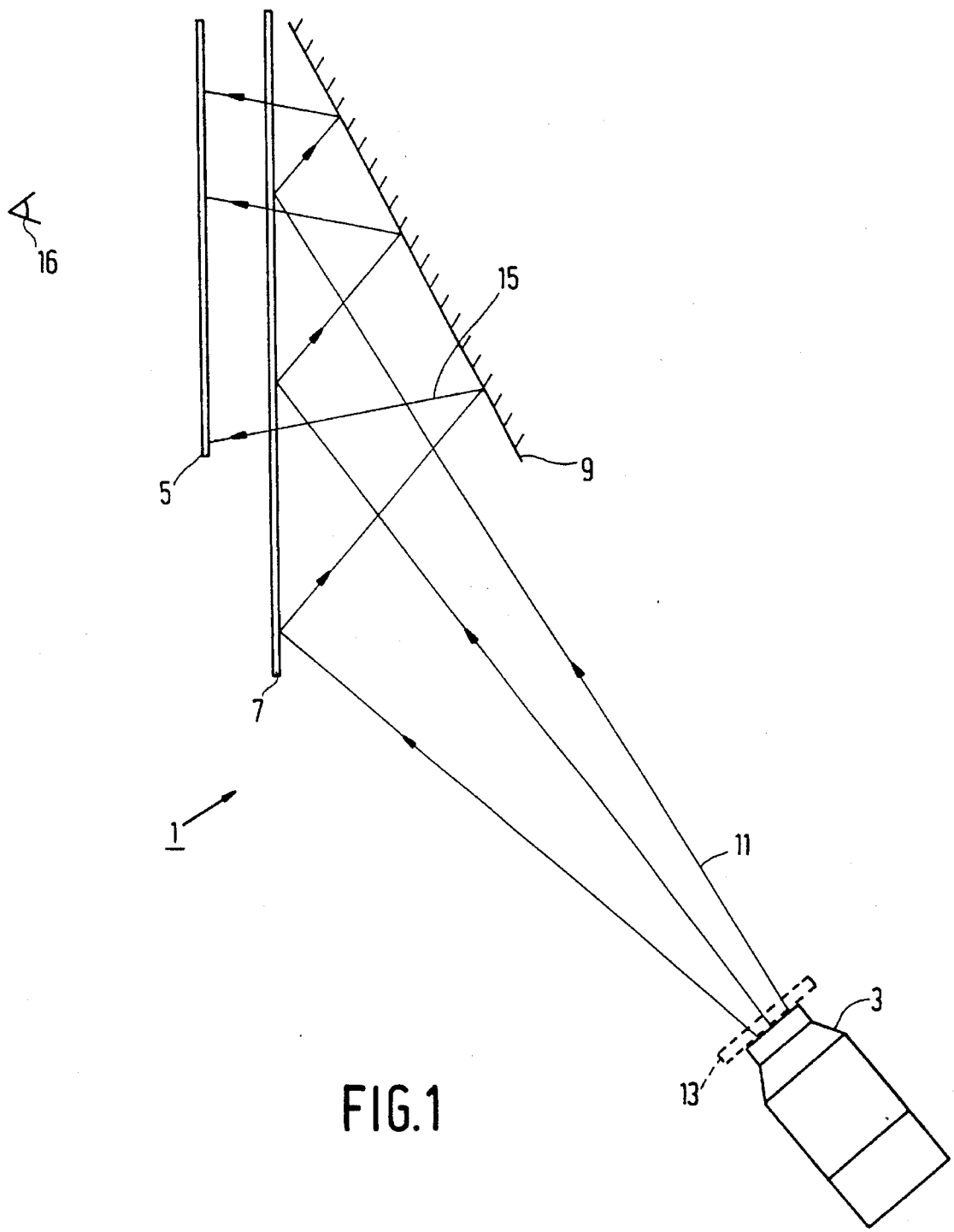
FIG. 1 shows diagrammatically a first embodiment of an image projection system according to the invention.

The image projection system 1 shown diagrammatically in FIG. 1 comprises an image projector 3 which is provided with an image display system for supplying an image to be projected on the image projection screen 5 via a system of projection lenses. Moreover, the image projection system 1 comprises a beam splitter 7 and a reflector 9. The beam splitter 7 and the reflector 9 together fold the optical path required for the image projection in such a way that the build-in depth of the system is relatively small. An image projected on the screen 5 can be observed by an observer 16 who is present at the side of the screen 5 remote from the beam splitter and the reflector.

The images may be both monochrome and color images. The image display system may comprise, for example one cathode ray tube for generating a monochrome image, or three cathode ray tubes for generating a color image. Such a projector supplies unpolarized radiation.

In the device known from said European Patent Application, half the projection beam radiation is reflected to the reflector by the beam splitter. After reflection by the reflector, only half of this radiation is passed to the projection screen so that only 25% of the radiation supplied by the projector reaches the projection screen.

A considerable improvement of the light output is obtained when a polarization-sensitive reflector is used in combination with a projector supplying a suitably polarized projection beam. In fact, a much higher percentage of the radiation supplied by the projector can then be utilized in a relatively simple way for the formation of the image. Polarized radiation is supplied by, for example a projector having liquid crystal display panels, hereinafter referred to as LCD projector. For displaying monochrome images, the image display system is to have only one image display panel. For displaying color images, the image display system comprises, for example three liquid crystal panels and a set of color-separating and color-combining elements, in other words a color channel for each of the primary colors, or a single display panel in combination with a pattern of color filters. An image display panel is herein understood to mean the liquid crystalline layer in combination with a polarizer and an analyser. An image projection system for a color image is described, for example in U.S. Pat. No. 4,127,322. The pixels, which are part of a layer of liquid crystalline material, change the direction of polarization of a polarized radiation beam incident on the pixel in conformity with the image information. There are image display panels which modulate linearly polarized radiation, hereinafter referred to as linear display panels, and image display panels which modulate circularly polarized radiation, hereinafter referred to as circular display panels. In the case of a linear display panel the beam is to be convened into a circularly polarized beam before it is incident on the cholesteric filter. This can be realised, for example by providing the projector with a $\lambda/4$ plate 13. This $\lambda/4$ plate 13 is shown by way of a broken line because it can be dispensed with if the projector comprises circular display panels.

In the image projection system according to the invention the beam splitter 7 is a cholesteric filter. When an unpolarized radiation beam is incident on such a filter, the filter will reflect the pan of the beam with a wavelength adapted to the pitch of the molecular helix and with a direction of rotation adapted to the direction of the molecular helix, whereas the other pan of the beam will be passed. If use is made of a polarized radiation beam, for example, a beam from an LCD projector whose direction of polarization corresponds to the direction of polarization reflected by the cholesteric filter, a compact and efficient image projection system can be obtained with the reflector 9. It is assumed that the beam 11 from the projector 3 is levorotatory circularly polarized and that the direction of the molecular helix of the cholesteric filter 7 is also levorotatory. The projection beam 11 from the projector 3 is then substantially completely reflected from the cholesteric filter 7 to the reflector 9. By reflection on the reflector 9, the circular direction of polarization, which is levorotatory in this case, is inverted into the dextrorotatory direction. This dextrorotatory circularly polarized beam 15 will be passed by the cholesteric filter 7 and reach the projection screen 5. In principle, 100% of the projection beam supplied by the projector 3 can then be utilized for the image projection.

A cholesteric filter can be made at an acceptable cost in the format required for the application described.

In the case of color image projection, the cholesteric filter should have a reflection wavelength bandwidth which is at least equal to the wavelength bandwidth of visible light.

The cholesteric filters already known operate as polarization-sensitive reflectors within a limited wavelength band, for example 50 nm. Radiation at a wavelength outside the wavelength band is passed and is thus lost or disturbs the formation of the image in its current use. The wavelength bandwidth of the full visible light is approximately 380 nm.

The width of the reflection wavelength band $\Delta\lambda$ of the filter is defined by $\Delta\lambda=\lambda_0\Delta n/\bar{n}$, in which $\Delta n=n_e-n_o$ is the birefringence, in which $n_e$ and $n_o$ are the extraordinary and ordinary refractive indices, respectively, of the cholesteric material and $\bar{n}=(n_e+n_o)/2$ is the average refractive index. $\lambda_o$ is the central wavelength of the selective reflection wavelength band upon perpendicular incidence of the radiation and is given by $$\lambda_0 = \bar{n}p = \frac{(n_e + n_0)}{2} p,$$

in which p is the pitch of the molecular helix of the filter.

Since the shift of the reflection wavelength band as a function of the angle of incidence is, for example 2 nm per degree, a broader reflection wavelength band than is necessary to cover the full visible wavelength range of 380 nm to a wide extent is to be taken into account when manufacturing the filter.

A cholesteric filter which is active in the full visible wavelength range can be realised in various manners.

A first possibility is to stack a plurality of narrow-band cholesteric layers each having a different reflection wavelength band. The composite filter then has a total reflection bandwidth which is equal to the sum of the reflection bandwidths of the individual layers.

A second possibility is to manufacture the cholesteric filter from a single layer of liquid crystalline polymer material, in which the pitch p of the molecular helix varies across the layer thickness between a lower limit and an upper limit so that the resultant reflection wavelength bandwidth corresponds to the bandwidth which is necessary for the filter to be active in the full visible wavelength range. As compared with a stacked filter, a single-layer filter has the advantage of a better optical quality. When layers are stacked, the optical quality decreases with an increasing number of layers due to the presence of errors in the cholesterics and due to the loss of planar molecular ordering. Moreover, the viewing angle dependence increases with an increasing thickness. This means that for radiation which is incident at an angle which is larger than a given angle of incidence, the effectiveness of the filter decreases considerably with larger layer thicknesses. In order that a cholesteric layer with a reflection wavelength bandwidth of 50 nm has a polarizing effect, the layer should have a minimum thickness of 5 µm. A multilayer filter which is active throughout the visible light range and for a large range of angles of incidence should comprise, for example fifteen of such layers and is then 75µm thick.

For a single-layer cholesteric filter with a varying pitch, a layer thickness of 20µm is sufficient to be effective as a polarizer, which improves the effectiveness of the filter. A manner of manufacturing a single-layer cholesteric filter with a pitch varying across the layer thickness is described in the previously mentioned U.S. patent application Ser. No. 08/179,420, allowed Aug. 25, 1995.

An embodiment of the cholesteric filter whose optical quality is better and whose viewing angle dependence is not as great as that of a cholesteric filter composed of a relatively large number of narrow-band layers with a constant helix pitch is realised by manufacturing the cholesteric filter from a smaller number of layers in which in at least a number of these layers the pitch p of the molecular helix varies across the layer thickness. The reflection wavelength bandwidth of the relevant layers may be increased to, for example 150 nm. In that case the number of layers required for the visible wavelength range can be reduced considerably, for example to ⅓.

Figure 2:
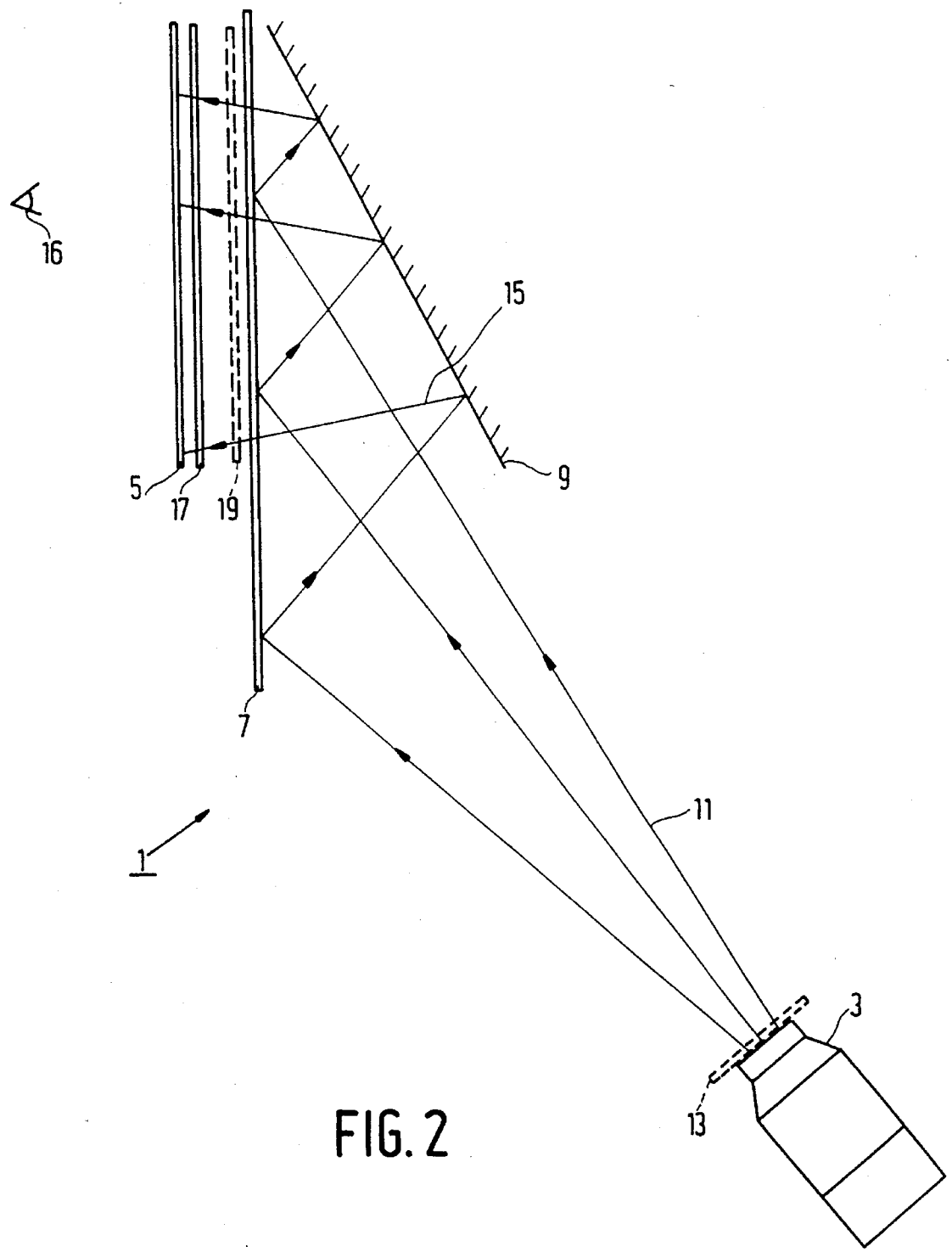
FIG. 2 shows diagrammatically a second embodiment of an image projection system according to the invention, having an improved contrast.

FIG. 2 shows diagrammatically a second embodiment of the image projection system according to the invention. A polarizer 17 is arranged between the cholesteric filter 7 and the screen 5. This polarizer 17 absorbs substantially 50% of the unpolarized ambient light entering the projection screen so that this light can no longer be reflected in the audience space. Consequently, a considerable improvement of contrast can be achieved.

Moreover, a λ/4 plate 19 may be arranged between the cholesteric filter 7 and the polarizer 17. In the case of color image projection, this λ/4 plate has a wide band. This λ/4 plate 19 converts the circularly polarized radiation passed by the cholesteric filter 7 into linearly polarized radiation. The polarizer 17 is adapted in such a way that the circular direction of polarization which is to be reflected by the cholesteric filter 7 is absorbed after conversion by the λ/4 plate 19. In this manner a possibly imperfect selectivity between levorotatory and dextrorotatory circularly polarized radiation is compensated for by the cholesteric filter. The fraction of the projection beam which should have been reflected upon incidence on the cholesteric filter, but is still passed in a non-ideal filter or for a non-ideal state of polarization of the projection beam, is converted into linearly polarized light having a given direction of polarization. The direction of polarization of the polarizer 17 is then chosen to be such that this linearly polarized radiation is absorbed. Consequently, unwanted light which is passed by the filter instead of being reflected is prevented from disturbing the image on the projection screen. Since the λ/4 plate is optional, it is shown in broken lines again.

Instead of the λ/4 plate 19 and the polarizer 17, a louvre screen (not shown) may be arranged between the cholesteric filter 7 and the screen 5 so as to pass only radiation which is incident within a given angle to the screen, as described, for example in European Patent Application EP 0 488 590.

I claim:

1. An image projection system comprising a projector for supplying a projection beam which is modulated with the image to be projected, an image projection screen and a folding system arranged between the image projector and the image projection screen, the folding system comprising a beam splitter for at least partly reflecting the projection beam from the projector and a reflector for receiving the part of the projection beam reflected by the beam splitter and for reflecting said part to the beam splitter again, characterized in that the beam splitter is a cholesteric filter, the cholesteric filter being active within at least an essential part of the full visible wavelength range, and the cholesteric filter comprises a plurality of layers of a liquid crystalline material, each layer being active for a different wavelength band, said wavelength bands jointly covering substantially the visible wavelength range.

2. An image projection system as claimed in claim 1, characterized in that at least a plurality of layers of the cholesteric filter comprises a liquid crystalline polymer material, within which layers the pitch of the molecular helix varies across the layer thickness between two values which correspond to the lower limit and the upper limit, respectively, of the reflection wavelength band of the relevant layer.

3. An image projection system as claimed in claim 1, characterized in that a polarizer is arranged between the image projection screen and the beam splitter.

4. An image projection system as claimed in claim 2, characterized in that a polarizer is arranged between the image projection screen and the beam splitter.

5. An image projection system comprising a projector for supplying a projection beam which is modulated with the image to be projected, an image projection screen and a folding system arranged between the image projector and the image projection screen, the folding system comprising a beam splitter for at least partly reflecting the projection beam from the projector and a reflector for receiving the part of the projection beam reflected by the beam splitter and for reflecting said part to the beam splitter again, characterized in that the beam splitter is a cholesteric filter, the cholesteric filter being active within at least an essential part of the full visible wavelength range, and the cholesteric filter comprises a single layer of a liquid crystalline polymer material, within which layer the pitch of the molecular helix varies across the layer thickness between two values which correspond to the lower limit and the upper limit, respectively, of the wavelength band required to cover at least the full visible wavelength range.

6. An image projection system as claimed in claim 5, characterized in that a polarizer is arranged between the image projection screen and the beam splitter.

7. An image projection system comprising a projector for supplying a projection beam which is modulated with the image to be projected, an image projection screen and a folding system arranged between the image projector and the image projection screen, the folding system comprising a beam splitter for at least partly reflecting the projection beam from the projector and a reflector for receiving the part of the projection beam reflected by the beam splitter and for reflecting said part to the beam splitter again, characterized in that the beam splitter is a cholesteric filter, and a polarizer is arranged between the image projection screen and the beam splitter.

8. An image projection system as claimed in claim 7, characterized in that a λ/4 plate is arranged between the polarizer and the beam splitter, the polarizer having an absorbing effect for the direction of polarization of the circular direction of polarization to be reflected by the cholesteric filter after conversion by the λ/4 plate.

9. An image projection system as claimed in claim 7, characterized in that, the cholesteric filter is active within at least an essential part of the full visible wavelength range.

10. An image projection system as claimed in claim 9, characterized in that a λ/4 plate is arranged between the polarizer and the beam splitter, the polarizer having an absorbing effect for the direction of polarization of the circular direction of polarization to be reflected by the cholesteric filter after conversion by the λ/4 plane.

11. An image projection system as claimed in claim 3, characterized in that a λ/4 plate is arranged between the polarizer and the beam splitter, the polarizer having an absorbing effect for the direction of polarization of the circular direction of polarization to be reflected by the cholesteric filter after conversion by the λ/4 plane.

12. An image projection system as claimed in claim 6, characterized in that a λ/4 plate is arranged between the polarizer and the beam splitter, the polarizer having an absorbing effect for the direction of polarization of the circular direction of polarization to be reflected by the cholesteric filter after conversion by the λ/4 plane.

13. An image projection system as claimed in claim 4, characterized in that a λ/4 plate is arranged between the polarizer and the beam splitter, the polarizer having an absorbing effect for the direction of polarization of the circular direction of polarization to be reflected by the cholesteric filter after conversion by the λ/4 plane.

* * * * *